United States Patent [19]

Engle

[11] 4,012,080
[45] Mar. 15, 1977

[54] PNEUMATIC TO HYDRAULIC CONVERTER WITH INTEGRAL DUMP CHAMBER

[75] Inventor: Thomas H. Engle, Cape Vincent, N.Y.

[73] Assignee: General Signal Corporation, Rochester, N.Y.

[22] Filed: Aug. 29, 1974

[21] Appl. No.: 501,939

Related U.S. Application Data

[63] Continuation-in-part of Ser. No. 417,707, Nov. 30, 1973, abandoned.

[52] U.S. Cl. .............................. 303/114; 60/547; 60/593; 91/443
[51] Int. Cl.² .......................................... B60T 8/10
[58] Field of Search ......... 303/21 FB, 114; 60/547, 60/582, 593; 91/449, 443

[56] References Cited

UNITED STATES PATENTS

| 3,480,121 | 11/1969 | Maigrot | 91/443 X |
| 3,578,820 | 5/1971 | Riordan | 303/21 FB |
| 3,586,386 | 6/1971 | Trocme | 91/443 X |
| 3,627,386 | 12/1971 | Every | 303/21 FB |

FOREIGN PATENTS OR APPLICATIONS 502,775   3/1939   United Kingdom

Primary Examiner—Alan Cohan
Assistant Examiner—Gerald A. Michalsky
Attorney, Agent, or Firm—Pollock, Vande Sande & Priddy

[57] ABSTRACT

A pneumatic to hydraulic booster having an integral skid control means is disclosed. The skid control means includes a dump chamber and a dump valve, with the dump chamber being integrally formed within the housing of the pneumatic to hydraulic booster. A choke is also mounted between the dump chamber and atmosphere to provide a two-stage controlled dump rate. In operation, a large portion of the pneumatic pressure in the booster is quickly transferred to the dump chamber when a skid is detected. The atmospheric choke allows a further transfer of pressure from the booster at a second, but controlled rate.

7 Claims, 6 Drawing Figures

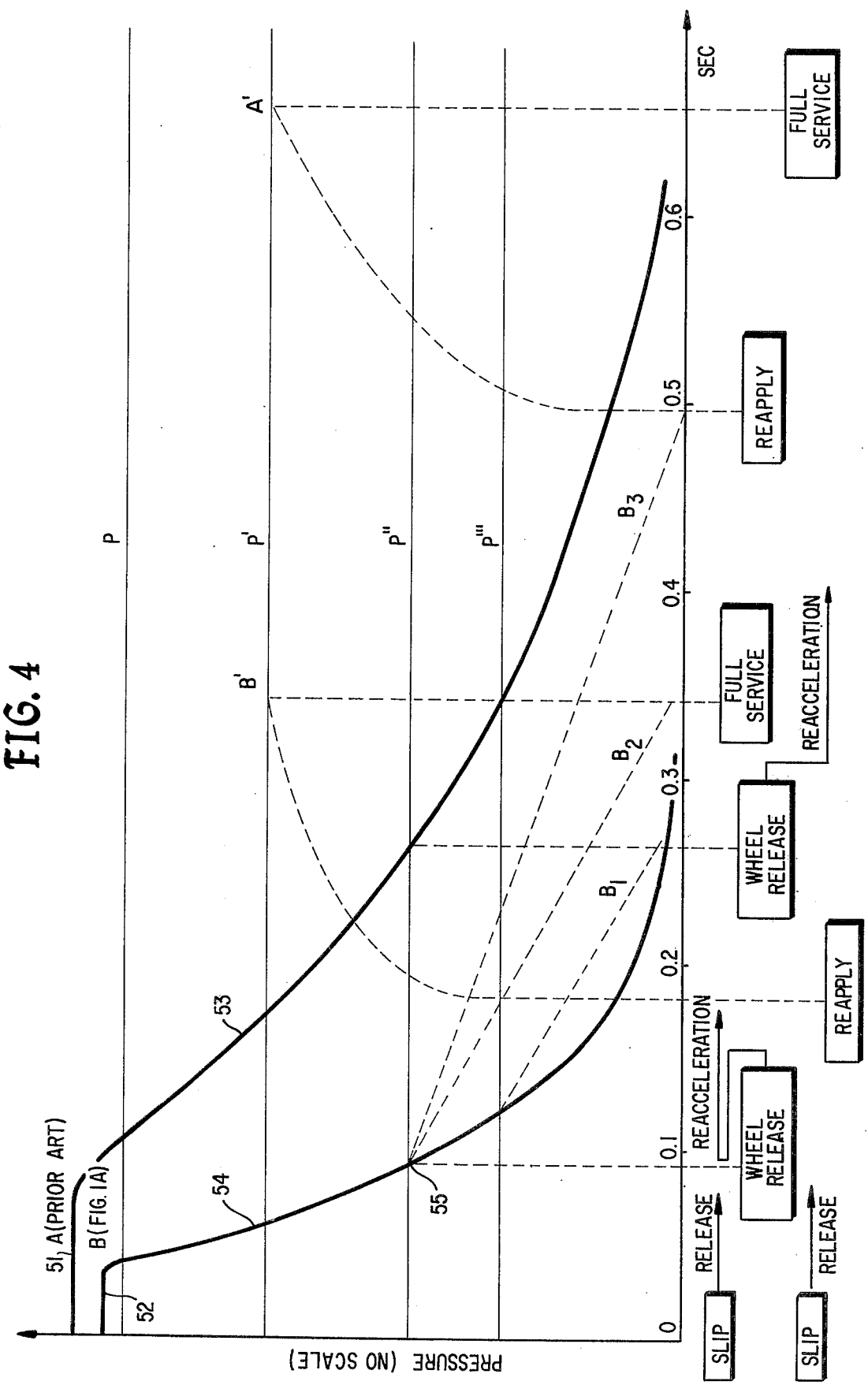

4,012,080

PNEUMATIC TO HYDRAULIC CONVERTER WITH INTEGRAL DUMP CHAMBER

REFERENCE TO RELATED APPLICATION

This application is a continuation-in-part of application Ser. No. 417,707 filed Nov. 30, 1973 by Thomas H. Engle for PNEUMATIC TO HYDRAULIC CONVERTOR WITH INTEGRAL DUMP CHAMBER and now abandoned.

Field of the Invention

The present invention is applicable to lightweight mass transit or rapid transit vehicles using a pneumatic control system, hydraulic actuators and caliper type disc brakes. It is also applicable to any vehicle using a pneumatic control system and pneumatic brake actuators. The majority of transit vehicles presently utilize mechanical linkage systems for transmitting a braking force from an air cylinder of a pneumatic braking system to the individual brake shoes which are suspended adjacent to the wheels of the rail vehicle. These conventional brake systems are not normally adaptable to the new lightweight rail vehicles because of space and weight limitations. The present invention is also applicable to conversion systems whereby hydraulic brakes are installed which utilize pneumatic to hydraulic convertors and the pneumatic control systems which are already present on the rail vehicle. Additionally, the present invention is intended for use in trucks or any pneumatic braking system employing a pneumatic fluid pressure means for actuating a friction brake system.

In particular, the present invention is applicable on brake systems as previously described which further include a means for detecting and controlling wheel slide or skid. These systems often include a normally closed magnet valve installed between the pneumatic control system and the pneumatic brake actuator to dump the air pressure present in the actuator when a skid condition is detected.

SUMMARY OF THE INVENTION

An object of the present invention is to provide a pneumatic to hydraulic convertor with an integral dump system for quickly and efficiently controlling the skid of a train wheel during a normal service application. The present invention is intended to provide an improved skid control system whereby "wheel release" is achieved at the earliest possible moment. Wheel release is defined at that point at which the retarding effect imposed upon the vehicle wheels of the brake system drops below the rotational force exerted on the wheel by the rail due to the coefficient of friction therebetween. At this point in time, the wheel begins to reaccelerate to the linear track velocity. A primary object of this invention is to provide a system that will enable the wheel to begin its reacceleration at the earliest possible moment.

Another object of this invention is to provide a dump chamber immediately adjacent the fluid responsive pneumatic motor means with two high capacity conduits therebetween. Communication between these conduits is normally closed by a high capacity, fast response, twoway, normally closed magnet valve. Upon detection of a skid condition, the magnet valve is opened, and the pneumatic pressure present in the pneumatic motor is allowed to dissipate into the dump chamber while, in one embodiment, the pneumatic inlet is simultaneously closed to minimize loss of pressure in the brake actuating pressure line. In another embodiment, the pneumatic inlet may remain open to the pneumatic motor while the dump valve is open; however, somewhat slower pressure loss is experienced in the pneumatic motor in this instance. The dump chamber is further equipped with a choke which will allow a two-stage rate of pressure dissipation, with a high initial dump rate into the chamber and a much lower second stage dissipation rate through the choke.

Another object of the present invention is to provide a pneumatic to hydraulic convertor with an integral dump chamber wherein the convertor includes a fluid responsive pneumatic motor means. This motor means includes a housing which defines a fixed wall chamber and a movable chamber wall which is responsive to the admission of pneumatic pressure to drive the movable chamber wall. This housing also defines a dump chamber adjacent said fixed wall chamber to receive a predetermined portion of the admitted fluid pressure when a skid signal is received. A dump valve means is interposed between the fluid responsive pneumatic motor means and the dump chamber and is responsive to a skid detecting control signal to open communication between said pneumatic motor means and the dump chamber. The convertor also includes a hydraulic master cylinder and piston means for delivering hydraulic fluid under pressure when the pneumatic motor means is pressurized. In the preferred embodiment of the invention, the fixed wall chamber defines a single common wall which forms a portion of the fixed wall chamber and a portion of the dump chamber.

A further object of the present invention is to provide a dump system for use in a pneumatic control system which will provide a wheel release upon skid detection 2 to 3 times sooner than conventional prior art systems.

Brief Description of the Drawings

FIG. 4 is a chart comparing the response times of the preferred embodiment of FIG. 1A of the invention with a conventional prior art dump system.

Detailed Description of the Invention

Figure 1:
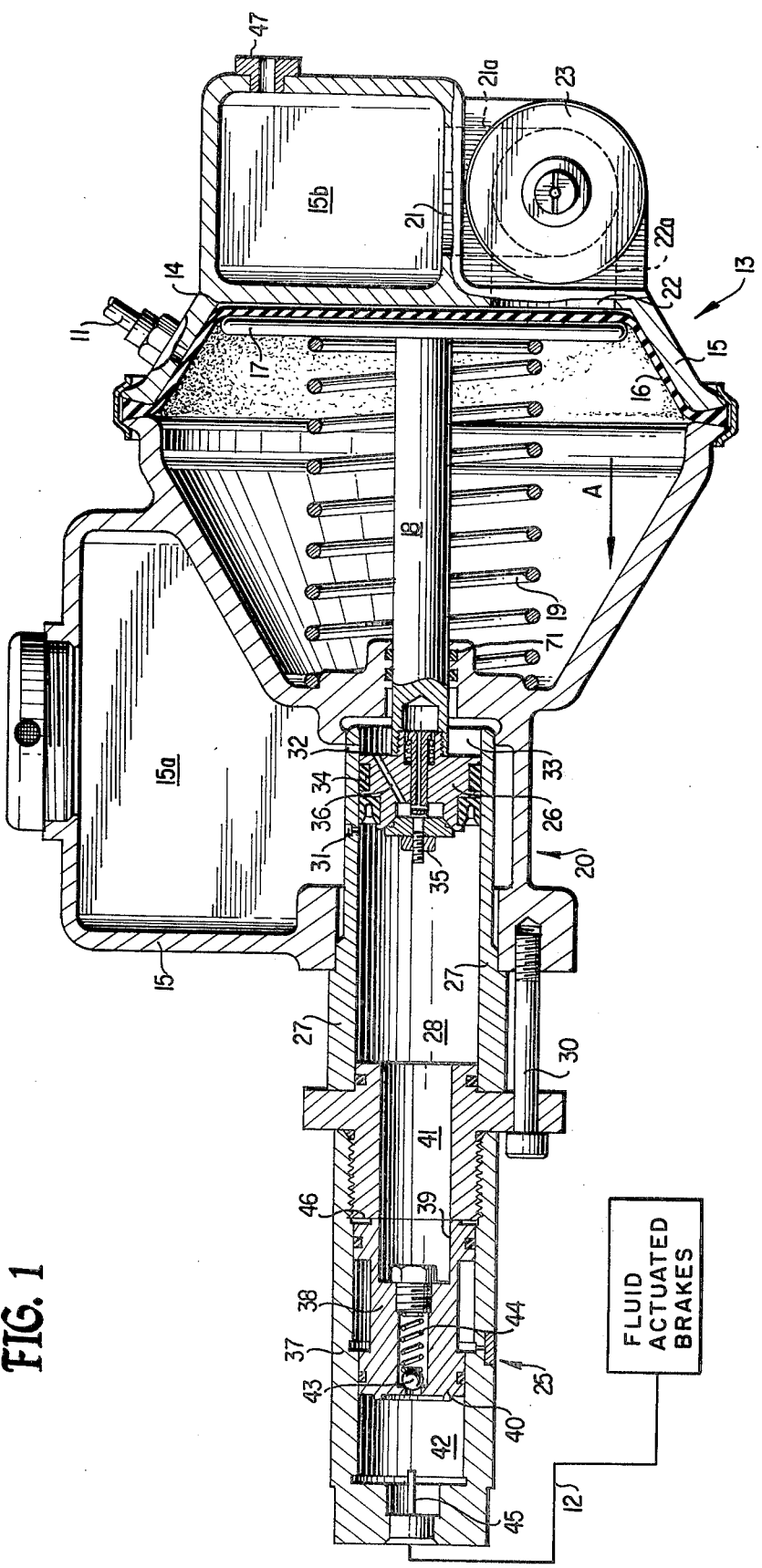
FIGS. 1 and 1A are cross-sectioned views of alternate embodiments of the pneumatic to hydraulic convertor having an integral dump chamber.
Figure 1A:
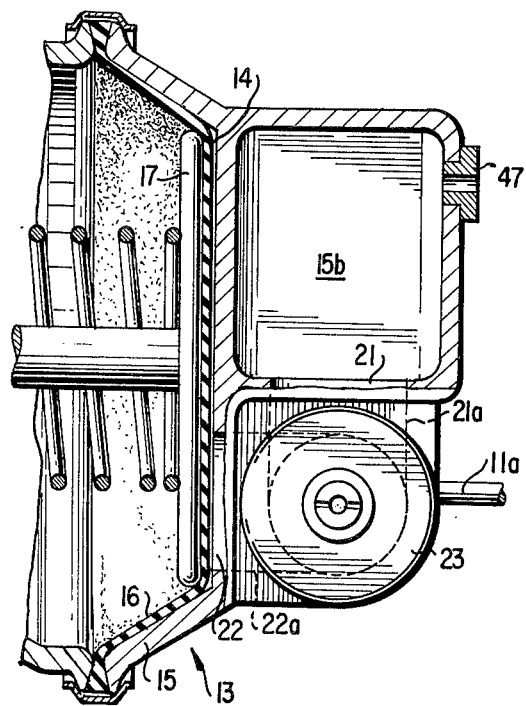

FIGS. 1 and 1A are cross-sectioned views of the pneumatic to hydraulic convertor and its associated integral dump chamber, showing alternate locations for inlet conduits 11 and 11a, respectively. Except where noted, the embodiments of FIGS. 1 and 1A function identically. The present convertor is intended for use on mass transit or rapid transit vehicles which employ disc brakes and hydraulic actuators to provide optimum braking effort. Hydraulic actuators are desirable on mass transit or rapid transit vehicles since the brakes are operated much more frequently than with conventional rail vehicles, and since the braking systems must be relatively precise in order to avoid sudden stops or undue variations in rate of vehicle deceleration. In addition, the small size of the actuators, and the light weight of the hydraulic equipment provide a wide choice of design parameters in laying out the vehicle trucks.

In the braking system for which the pneumatic to hydraulic convertor is intended, pneumatic pressure is supplied in the usual manner from an auxiliary reservoir to a control valve which actuates the braking system. The control valve may be electrically or pneumatically controlled. It receives input pneumatic pressure from the auxiliary reservoir and supplies an output pneumatic pressure to conduit 11 or 11a which is connected to the fluid responsive pneumatic motor means of the present invention. This fluid pressure is then translated to hydraulic fluid pressure by means of the pneumatic to hydraulic convertor of the present invention. Inasmuch as there is a substantial differential between the area of the pneumatic fluid pressure motor and the area of the master piston in the hydraulic master cylinder, the pneumatic to hydraulic convertor also provides a substantial boosting effect to the pressure in the hydraulic output line 12 which is connected to fluid actuated brakes, as indicated schematically. Under normal conditions, the brakes are deactuated simply by reducing the pressure in conduit 11 or 11a.

Referring to FIGS. 1 and 1A, pneumatic fluid under pressure is supplied through conduit 11 or 11a to a fluid responsive pneumatic motor means generally indicated by the numeral 13. This motor means comprises a working chamber 14 which is defined by two-part the right half of booster housing 15 and the flexible diaphragm member 16. The flexible diaphragm 16 is backed by a reciprocating member 17 which is fixably attached to a reciprocating connecting rod 18. As illustrated in FIGS. 1 and 1A, when working chamber 14 is pressurized, the flexible membrane 16 and the reciprocating member 17 are displaced to the left thereby actuating a hydraulic master cylinder and piston means generally indicated by the numeral 20. The reciprocating reciprocating member 17 is biased to the position illustrated in FIGS. 1 and 1A by virtue of a resilient spring means 19 located within the housing of the pneumatic to hydraulic convertor. The left half of housing member 15 defines a hydraulic sump 15a for storage of hydraulic fluid for the hydraulic motor means 20. The right half of housing member 15 defines an integral dump chamber 15b and a pair of dump passageways 21 and 22. Since only a portion of the passageways 21 and 22 is illustrated in the cross-sectional portion of FIGS. 1, 2 and 1A, the remaining portion of the passageway is indicated by the dotted lines 21a and 22a.

The interconnection between the working chamber 14 of the fluid responsive pneumatic motor means and the dump chamber 15b is normally closed by means of a dump valve 23 which is interposed between passageways 21 and 22. This interconnection and the operation of the dump valve 23 will be subsequently described with reference to FIG. 3.

The pneumatic to hydraulic convertor illustrated in FIGS. 1 and 1A also includes a slack adjusting means generally designated by numeral 25. Upon receiving the initiating control signal, the control valve (not shown) will supply air under pressure through conduit 11 or 11a to the fluid responsive pneumatic motor means 13. As the pressure in working chamber 14 increases, it will drive diaphragm 16 and reciprocating member 17 to the left as indicated by arrow A in FIGS. 1 and 1A. The force exerted by the flexible diaphragm and reciprocating member is transmitted through the connecting rod 18 to hydraulic master piston 26 in the hydraulic master cylinder and piston means 20. The hydraulic master piston 26 in turn supplies hydraulic fluid under pressure to the slack adjustor 25. The output of slack adjustor 25 is transmitted through hydraulic line 12 to the hydraulic actuators mounted on the disc brakes (not shown).

When the control valve (not shown) has received a signal to de-energize the friction brake system, it will vent control line 11 or 11a to reduce the pressure in working chamber 14. As the pressure in chamber 14 is reduced, the spring means 19 will return reciprocating member 17 to the extreme righthand position illustrated in FIGS. 1 and 1A. As the reciprocating member is withdrawn, the connecting rod 18 returns the hydraulic master piston 26 to its extreme righthand position as illustrated in FIGS. 1 and 1A.

Figure 3:
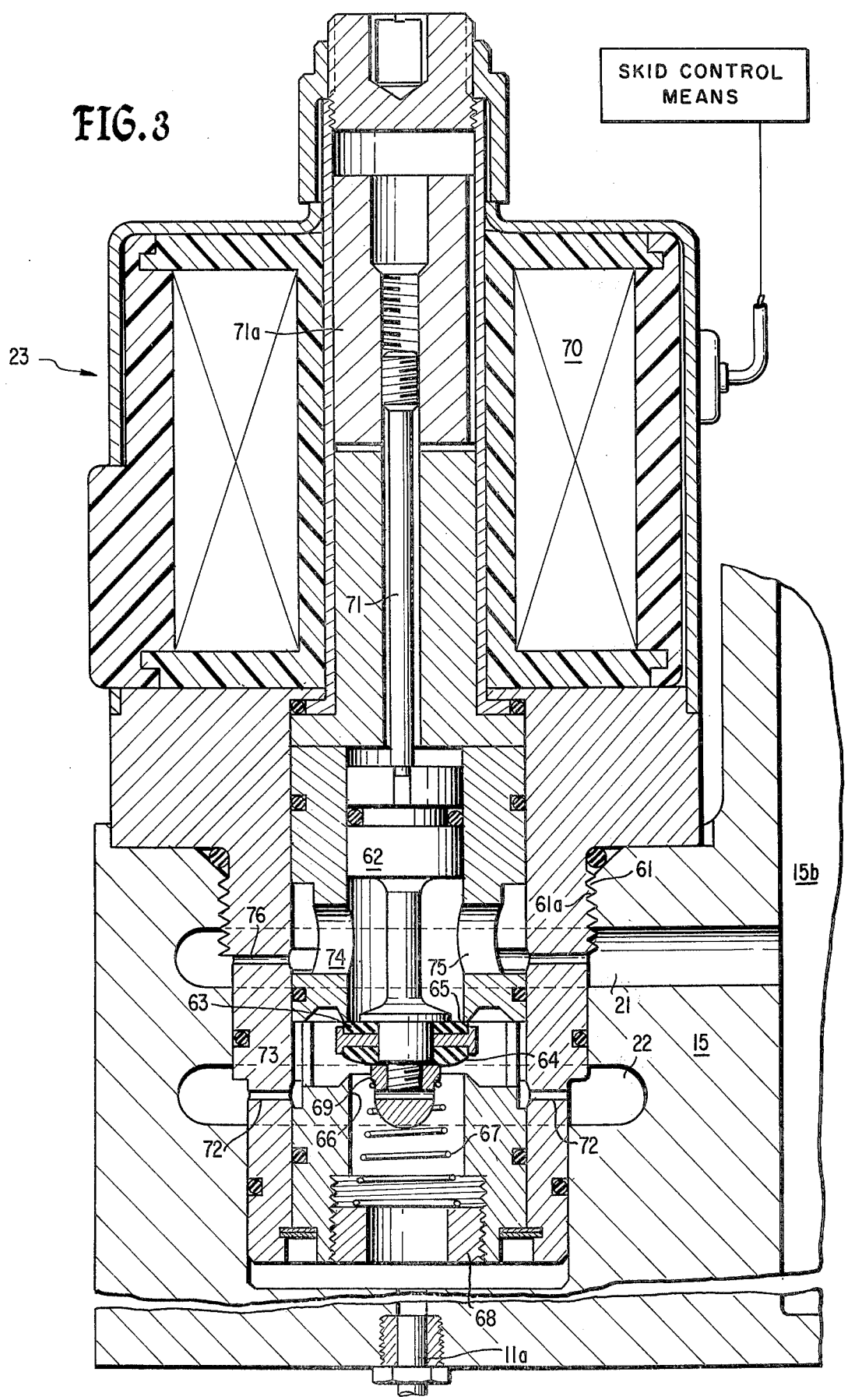
FIG. 3 is a cross-sectioned view of the dump valve and dump chamber used in the present invention.

The preferred embodiment of the invention shown in FIG. 1A is identical to that of FIG. 1, with the exception of the inlet conduit 11a, which is connected at the lower end of dump valve 23, as discussed in greater detail with regard to FIG. 3. This location of the inlet conduit 11a minimizes pressure losses in conduit 11a when valve 23 is actuated to alleviate a wheel slip condition and simultaneously ensures a more rapid pressure dissipation in chamber 14, than with the connection of conduit 11 shown in FIG. 1.

The Wheel Slip Dump Valve and Chamber

As was previously indicated, the present invention is intended for use in a braking system having a wheel slip control subsystem. These subsystems are designed to detect differences in speed between axles, and to detect angular deceleration during synchronous slips. These systems provide for a rapid reduction in the pneumatic brake cylinder pressure of the sliding truck during brake applications when a slip or slide is detected. Normally, prior art systems of this type are engineered to provide for failsafe operation through the use of normally de-energized relays and normally de-energized solenoid actuators which operate dump valves in the pneumatic equipment. These systems are generally made up of three basic subsystems; detection, relay logic, and pneumatic valving. The present invention is related to the latter. It is common practice to install the dump valve between the output side of the control valve, and the input side of the pneumatic motor. If this system is a combined pneumatic and hydraulic system, it is installed between the output side of the control valve and the input side of the pneumatic to hydraulic convertor. After a skid or slide has been detected, and the appropriate relay logic energized, a dump valve is opened to exhaust the pneumatic pressure in the pneumatic brake actuator, or in the pneumatic to hydraulic convertor. The present invention is an improvement upon those systems as hereinbefore described that use dump valves in combination with fluid responsive pneumatic motors.

The dump valves used in the present invention are high-capacity, fast-response, normally closed magnet valves. They are installed in the housing of the pneumatic motor means and normally close a passageway extending between the pneumatic motor means and an integral dump chamber. As illustrated in FIGS. 1 and 1A, the dump chamber 15b is defined by the walls of the right half of housing 15 as an integral part thereof.

The conventional systems use a dump valve installed in conduit 11 or 11a and some distance removed from the pneumatic motor means. This means that in order to exhaust the fluid pressure in working chamber 14, the entire amount of pressure must pass through conduit 11 or 11a to the dump valve before working chamber 14 is depressurized. The present invention, however, uses rather large passageways 21 and 22 to interconnect the working chamber 14 with the dummp chamber 15b. These passageways, together with the high capacity dump valve 23, provide almost instantaneous communication between working chamber 14 and the dump chamber 15b. This vastly reduces the response time of the present invention.

In analyzing the wheel slip problem, it is necessary to acknowledge the sequence of events involved in detecting and correcting the slide. These events may be summarized as follows: 1. Application of brakes; 2. Beginning of wheel slip; 3. Detection of wheel slip; 4. Actuation of dump valves; 5. Release of braking pressure; 6. Wheel release, that time period at which the relative rotational force exerted by the track on the slipping wheel exceeds the relative retarding effect of the remaining pressure in the pneumatic brake system; 7. Reacceleration of the wheel to the linear track velocity of the train; 8. Cessation of slip; 9. Reapplication of brake pressure; 10. Full service brake application.

Wheel slip may be summarized as a state existing when the peripheral velocity of the vehicle wheel is less than the linear track velocity of the vehicle, i.e. the wheel is rotating slower than it would if there were no slippage between the peripheral surface of the wheel and the track. The biggest problem involved in reestablishing full service application of the brakes is the response time between the release of the pneumatic brake pressure and the establishment of wheel release from the brake system. There are two separate time elements involved. First, wheel release must be effected as soon as possible. The greater the difference between the relative peripheral velocity of the wheel and the linear track speed, the longer the time required to reaccelerate the wheel to track velocity before the brakes may be reapplied. This means that the longer the skid condition is allowed to prevail, the longer it will take to stop the skid and reapply the brakes. The second problem is similarly related. The coefficient of friction between the track and the wheel decreases as the difference in peripheral speed and track speed increases. Thus, even after the brakes are released, it may be some time before the wheel ceases to slide, and begins to reaccelerate to track velocity. When one considers that the cause of the slip is usually due to a substance on the track, i.e. snow, rain, oil or grease, it becomes apparent that a substantial amount of time may elapse between detection of the slip, and reacceleration of the wheel to the linear track velocity.

The present invention is intended to provide the fastest possible termination of the initiated service application. Even with a dry track, the reacceleration time is substantial. At 60 m.p.h., the reacceleration velocity requires 0.1 second for each 6 m.p.h. differential in peripheral speed and track speed. If the wheels were locked with no peripheral velocity whatsoever, it would take a full second for the wheels to regain a 60 m.p.h. peripheral velocity once the retarding effect of existing service application has been removed. These times are increased as the coefficient of friction decreases. If instead of a dry track surface, the wheel slip occurs on a snowy or greasy surface, the reacceleration time can take much longer. The effects are cumulative in that 12 m.p.h. of differential velocity takes twice as long to correct as a 6 m.p.h. differential. Thus it becomes apparent that initiation of wheel release and reacceleration of the wheel must be accomplished as soon as possible.

FIG. 4 is a graph comparing a laboratory test of the preferred embodiment of FIG. 1A with a conventional prior art system. The embodiment of FIG. 1 is considered to perform similarly, as discussed in Ser. No. 417,707. The abscissa of the chart represents the time in tenths of seconds beginning with the initiation or the detection of the slip and ending with the reapplication of service pressure. The ordinate of the graph represents the pressure in pounds per square inch present in a pressure transducer piped to the pneumatic motor means. FIG. 4 also represents four separate pressure levels. The pressure indicated a P is the pressure at which the wheels will slip with a given track condition. The pressure indicated at P' is the pressure at which the wheels will not slip with the same track condition. The pressure level at P'' is the pressure at which wheel release occurs, that is, the pressure at which the retarding effect of the braking system is overcome by the coefficient of friction between the sliding vehicle wheel and the track. The P''' line represents the pressure at which it is known that the wheels will not slip under any given track condition.

Curve A represents the response time of a prior art system. Curve A' represents a simulated recovery curve which was added to the graph, but which was not part of any test. Curve B is the response time of the preferred embodiment of FIG. 1A, and curve B' represents the same simulated recovery response curve used for A'. Identical simulated recovery curves have been used for both curve A' and curve B' to avoid distortions in the elapsed time due to some unknown independent variable.

The straight line portions 51 and 52 for curves A and B represent the pipe length differentials of the two systems. This response time is considerably shorter for curve B than for curve A because the path the air travels to atmosphere is substantially shorter in the present invention. This is because the dump chamber is integrally formed with the pneumatic motor. In system A, the dump valve is connected to the fluid responsive motor through a short length of tubing. The curved portions 53 for curve A and 54 for curve B represent the rate of pressure drop, and are determined primarily by the size of the orifice used to evacuate the fluid responsive pneumatic motor. Since the present invention uses a high-capacity, fast-responsive valve, and since the orifices used are substantially larger than normal brake line tubing, the responsive time is shorter and the rate of pressure dissipation is greater for the preferred embodiment of the invention than for a conventional braking system.

The curved portion of curve B beginning at 55 represents the present invention with a dump chamber sized to receive the entire charge of air present in the pneumatic motor. Curves B1 and B2 represent constructed curves representative of the present invention having smaller dump chambers wherein the rate of pressure dissipation would fall as indicated by the sloped line 54 to point 55 and from that point, the pressure would fall at a much slower rate indicated by either sloped lines B1 or B2.

Line B3 is a constructed representation of the present invention with a dump chamber sized as for B2, but with a smaller exhaust orifice installed in the side of the dump chamber.

Since the response time for the braking system includes not only time necessary to reaccelerate the wheel to the track velocity, but also includes the time needed to repressurize the brake chamber, it is desirable to maintain as much of the braking pressure in the pneumatic motor means 13 and control conduit 11 and 11a as possible. Although the pressure line for P'' has been calculated for a given condition, it should be understood that the exact location of P'' would vary depending upon the track condition that initiated the slip. However, in FIG. 4, P'' represents that pressure at which wheel release occurs, or the level at which the wheel begins to reaccelerate to track velocity. Consequently any further reductions in braking pressure are unwarranted. It is therefore desirable to begin to conserve the air pressure already present in the pneumatic motor means. It should be pointed out that the electronic circuitry for the wheel slip system is at this point still registering a slip condition for the system and will maintain a dump configuration until the peripheral velocity of the wheel approximates that of the track velocity of the vehicle. Since the wheel is only reaccelerating, and has not reached track velocity, it is necessary to conserve the air pressure through a precalculated determination of what the P'' pressure would normally be.

The relative sizing of dump chambers as indicated by sloped lines B1 and B2 and the relative sizing of the exhaust orifices represented by sloped lines B2 and B3 are also predetermined and calculable values. Although it is possible to change the size of orifice after the convertor has been assembled, it would be impossible to change the dump chamber if the dump chamber is integrally cast with the pneumatic motor. Although it would be possible to provide bolt-on dump chambers with passageways similar to those indicated in FIGS. 1, 1A, 2 and 2A, the state of the art in the brake industry indicates that this adaptability is not necessary. At the present time, most mass transit or rapid transit vehicles have brake systems that are designed to their specific system requirements.

As was discussed earlier, the abscissa of the graph represents the elapsed time for the brake response. It should also be noted that the reapplication curves constructed along dotted lines A' and B' were set at specific time intervals. These time intervals are functions of the wheel release time. If a given condition has caused a certain rate of deceleration with respect to linear track velocity, it has been assumed that the removal of the retardation effort will cause a reacceleration at approximately the same rate. Of course, the reapplication time would be much shorter if the wheels hit a short section of snow or ice and then began to reaccelerate on dry rails. However, since one can not always count on having dry rails to reaccelerate the wheels, it has been assumed that the reacceleration rate will be approxiately the same as the deceleration rate. This means that the reapplication time is exactly double that of the wheel release time. If it took approximately 0.1 of a second to achieve wheel release, it will take approximately 0.1 of a second to reaccelerate the wheel to linear track velocity. With the response curves indicated in FIG. 4 it will take approximately an additional 0.1 to 0.2 seconds to reapply the brakes for service application. Thus from the initiation of the slip to the application of full service brakes, the present invention, as indicated by the constructed curve of FIG. 4, would take approximately between 0.3 and 0.4 of a second to reapply full service pressure after detection of the slip. The conventional prior art system however, did not achieve a wheel release condition, that is a drop in pressure below P'', until nearly 0.3 of a second after initiation of the slip. Since the relative peripheral velocity of the wheel has decreased for nearly 0.3 of a second instead of less than 0.1 of a second (as for curve B), the peripheral velocity of the wheel will be much slower at the point of wheel release for curve A than it was for curve B. Correspondingly, it will take a much longer time to reaccelerate the wheel to track velocity. As indicated in FIG. 4, the reacceleration time will also be nearly 0.3 of a second and the brake response curve will be an additional 1 to 0.2 of a second for a total of 0.6 to 0.7 of a second between the detection of the slip and the reapplication of brake pressure.

Thus it is apparent that the present invention will enable reapplication of the brakes almost three times as fast as a conventional system, and will enable a full service application to be resumed almost twice as fast.

The dump valve, dump chamber, and the associated passageways between the dump chamber and the pneumatic motor means are illustrated in FIGS. 1, 1A, 2, 2A and 3. FIGS. 1 and 1A illustrate the dump chamber 15b in cross-section, with the dump valve 23 arranged immediately below the chamber to close communication between the dump chamber 15b and the working chamber 14. The preferred connection of conduit 11a is clearly shown in FIGS. 2A and 3. The dump chamber 15b is normally exhausted through a choke 47 which provides a through passageway from chamber 15b to atmosphere. As was previously explained, the choke passageway 47 may be varied to vary the rate of pressure dissipation from working chamber 14.

Figure 2:
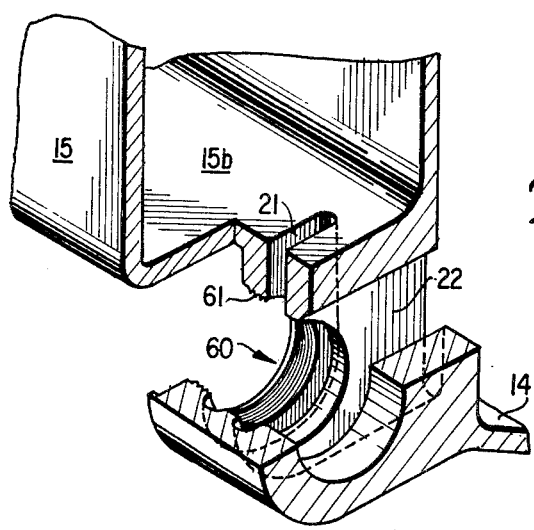
FIGS. 2 and 2A are isometric and partially cross-sectioned views of alternate embodiments of the dump passageways between the convertor and the dump chamber.
Figure 2A:
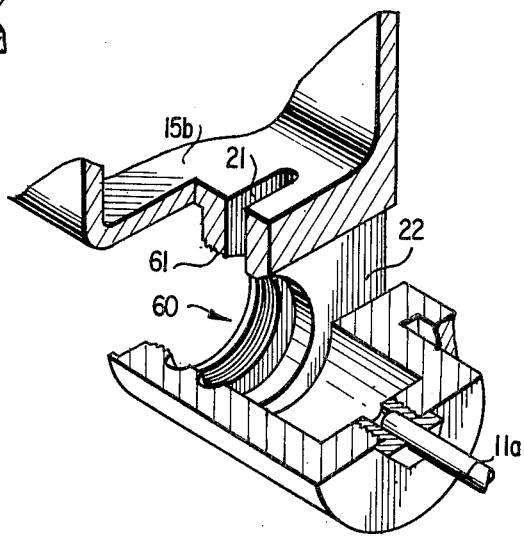

FIGS. 2 and 2A illustrate the dump chamber 15b and the interconnecting passageways 21 and 22 in isometric section. Passageway 22 extends from the dump chamber 14 to a central passageway 60 which interconnects the slotted passageway 21 with slotted passageway 22. Casing member 15 also defines a series of threads 61 in the inner periphery of passageway 60 to engage the dump valve 23. This engagement is more fully illustrated in FIG. 3.

FIG. 3 illustrates the dump valve and passageways 21 and 22 in cross-section, and shows the preferred connection of conduit 11a, which, of course, would not be present in the embodiment of FIG. 1. The dump valve 23 is a high-capacity, fast-response three-way, two position, normally closed magnet valve. It is rotatably threaded, as illustrated in FIG. 3, into threads 61 to close communication between passageways 21 and 22. Dump valve 23 includes an axially reciprocating spool means 62 having a pair of valve discs 63 and 64 mounted at the end thereof. These valve disks 63 and 64 reciprocate between a first, valve closing seat 65 and a second, valve opening seat 66. Valve disc 63 is normally urged into contact with valve seat 65 by means of resilient spring 67. Spring means 67 is held in place by means of through-bored retainer nut 68 and a recess 69 defined on the end of the axially reciprocating spool 62. The details of dump valve 23 are more fully set forth in my copending application Ser. No. 484,188 filed June 28, 1974, now abandoned, which is hereby incorporated by reference into this application.

The dump valve 23 is opened by application of an electrical control signal from a skid control means, indicated schematically to the electromagnetic winding 70 which surrounds a reciprocating actuator rod 71. When the electromagnetic coil 70 is energized, it displaces the pole piece 71a downward as illustrated in FIG. 3, thereby displacing rod 71 and spool 62 downward and compressing spring 67. As spool 62 is moved downward, valve disc 63 is unseated from seat 65 thereby opening communication between the working chamber 14, passageway 22, valve inlet passageway 72, the annular seating chamber 73, a cylindrical chamber 74, the axial passageway 75, and the exhaust passageways 76. Exhaust passageways 76 exit into the dump valve passageway 21 defined in casing 15 and to dump chamber 15b. In the preferred embodiment of FIG. 1A, disc 64 is simultaneously moved downward against annular seat 66 thus sealing off air supply coming from the control valve via conduit 11a. The air in diaphragm chamber 14 initially expands rapidly into dump chamber 15b effecting a rapid reduction in the local brake pressure in response to a wheel slip signal and then escapes more slowly via choke 47, preventing complete pressure loss in diaphragm chamber 14. When the electromagnet 70 is de-energized, the return spring 67 will unseat valve disc 64 from seat 66 and engage valve disc 63 with valve seat 65 to thereby close communication between annular seating chamber 73 and exhaust passageway 74. In the embodiment of FIG. 1A this admits air from conduit 11a and in either embodiment seals the working chamber 14 of the pneumatic motor means thereby preventing any additional pressure drop therein. Thus, small adjustments in the pressure in chamber 14 may be made to account for wheel slippage due to changing track conditions; whereas complete depressurization of chamber 14 is not required. Also, pressure losses in the supply conduit 11a are prevented in the embodiment of FIG. 1A.

The Fluid Responsive Motor Means

As previously described pressurization of conduit 11 or 11a by the control valve (not shown) resulted in a leftward displacement (as viewed in FIGS. 1 or 1A) of reciprocating number 17 and connection rod 18. Connecting rod 18 is reciprocally mounted within casing 15 by means of bearings and seals generally indicated at 71. A leftward displacement of connecting rod 18 results in a leftward displacement of the master piston 26 and actuation of the hydraulic master cylinder and piston means 20.

The hydraulic master cylinder and piston means of the present invention includes the hydraulic master piston member 26, a hydraulic master cylinder 27 and a hydraulic working space 28. Hydraulic fluid is stored in the reservoir 15a which is defined by the external walls of the left half of housing 15. As illustrated in FIGS. 1 and 1A, the hydraulic master cylinder 27 is a separate cylindrical member which is inserted into the left half of housing 15 and secured thereto by the hydraulic slack adjustor 25 and mounting bolts 30. Hydraulic working fluid enters the hydraulic working space 28 through a first working port 31 to insure that the working space 28 is completely filled with hydraulic fluid at all times. A second fluid port 32 is provided which communicates with a second working space 33 that cooperates with master piston 26 to transfer additional hydraulic fluid to the working chamber 28 when a slack adjustment has been made by slack adjustor 25. This transfer of fluid during slack adjustment will be subsequently explained.

Hydraulic motor piston 26 also includes an annular sealing ring 34 between the piston member 26 and the cylindrical wall of cylinder 27. Piston member 26 also includes a check valve generally indicated by the numeral 35. The check valve 35 is used to close a passageway 36 which extends through piston member 26. Check valve 35 normally closes communication between the working chamber 28 and the second chamber 33. Passageway 36 allows the transfer of hydraulic fluid from working space 33 to working space 28 when a slack adjustment is made by the slack adjustor 25.

The slack adjustor 25 comprises a stepped cylinder 37 and a differential area reciprocal piston means 38. This piston means is formed with a first large diameter piston portion 39 and a second smaller diameter piston portion 40 which fit into a pair of working spaces 41 and 42 with the first working space 41 being at the larger diameter end of the cylinder, and in continuous communication with the working chamber 28 of the hydraulic booster 20. The two working spaces 41 and 42 are normally isolated from each other, but under certain conditions, fluid can be transferred between the spaces through a valve unit 43 installed within the differential piston 38. Under normal working conditions, the valve unit 43 is closed by the hydraulic pressure present in chamber 41, and by its own internal compression spring 44. The valve unit may, however, be unseated by excess pressure present in working space 42. The valve thereby performs a check valve or release function and allows flow from space 42 to space 41 when the pressure in the former exceeds the latter by a predetermined amount. The valve means 43 can also be unseated mechanically by means of a push rod 45 which is affixed to the end of the cylinder 37. The push rod is effective to open the valve just before piston 38 reaches the limits of its leftward travel, or approximately 1/16th of an inch before the piston abuts the endcap. The stroke of piston member 38, and the respective volume of chamber 42 determines the clearance between the brake pads and discs.

When the pneumatic to hydraulic convertor is in service, and the brakes are released, the hydraulic motor 20 and the slack adjustor 25, assume their illustrated positions in FIGS. 1 and 1A. When a service brake application is initiated, the reciprocating member 17 is displaced to the left as previously described. As the piston 17, connecting rod 18 and hydraulic master reciprocating member 26 are displaced to the left, port 31 is closed and working chamber 28 is pressurized. As chamber 28 is pressurized the hydraulic fluid in chamber 41 is also pressurized, and this pressurization displaces piston member 38 to the left displacing hydraulic fluid from the working space 42 to the hydraulic brake actuators via conduit 12. If the brake pad clearance is less than that which the slack adjustor 25 is designed to maintain, the brake pads (not shown) will be moved into contact with their respective brake discs before piston member 38 reaches the limit of its leftward movement. At this point, the pressure in working space 42 will rise above the pressure in space 41 as a result of the difference between the cross-sectional areas of piston portions 39 and 40. When the pressure differential reaches the setting established by valve unit 43, the valve will be unseated to permit flow of hydraulic fluid from chamber 42 into chamber 41. As a result, the piston member 38 will be shifted all the way to its limiting lefthand position in immediate abutment with the endcap of cylinder 37.

Just before the piston member 38 abuts the endcover, a push rod 45 will open valve means 43 and the hydraulic motor 26 will be in direct communication with the hydraulic actuators of the disc brakes. The pressure developed in the various working chambers 28, 41 and 42, and in the hydraulic actuators will be proportional to the pneumatic command pressure initiated by the control means and presented to the pneumatic motor means and working space 14.

When the service brake is released, the output pressure developed by the control means is exhausted through conduit 11 and the spring means 19 returns the piston 17 thereby withdrawing the hydraulic master reciprocating member 26 to reduce the hydraulic pressure in working space 28, 41 and 42. Accordingly, the pressure now present in working chamber 42 will be effective to shift piston 38 to the right to effect closure of valve means 43. As the hydraulic master piston 26 retracts and withdraws hydraulic fluid from the working space 28, the slack adjustor piston 38 will also shift back towards the initial position and in effect transfer hydraulic fluid from working space 41 to working space 28. These fluid transfers are effected by the combined actions of the suction created by the booster and the retraction forces exerted by the caliper brake means.

If however, increased wear on the friction brake pads has resulted in a shoe clearance which is initially greater than desired, the slack adjustor functions in the following manner. The slack adjustor piston 38 will reach its lefthand position abutting the endcap of cylinder 37 before the hydraulic actuators have brought the brake pads into contact with the disc. At this point, the push rod 45 will unseat the valve means 43 so that the additional hydraulic fluid required to take up the remaining shoe clearance, and to thereby develop the desired level of braking force can be transferred through valve means 43 to the hydraulic actuators. Since a brake application has caused the piston means 38 to move full stroke into engagement with the endcap of cylinder 37, it follows that the subsequent release of the service brake will cause piston 38 to withdraw from the hydraulic actuators exactly the required quantity of hydraulic fluid. As stated previously, the volume of chamber 42 and the stroke of piston 38 is designed to effect the withdrawal of fluid establishing the proper clearance between the brake pads and the brake disc. Thus it follows that if the shoe clearance is additionally too great, slack adjustor 25 will reduce it to the desired value.

In each of the foregoing situations, the amount of hydraulic fluid returned to the working space 28 and reservoir 15a must be altered. When the shoe clearance is initially too great, the quantity of oil discharged from chamber 28 during the application will necessarily be greater than the quantity returned when the brakes are subsequently released. Therefore, during the release, the slack adjustor piston 38 will return to its initial position and contact abutment 46 before the hydraulic piston 26 has reached its retracted position. In this situation, oil will be transferred from the working chamber 33 to working chamber 28 through inclined passageway 36 and check valve 35. In situations where it is desired to use the booster suction initiated by the withdrawal of piston 26 to augment the retraction forces acting on the hydraulic brakes, the degree of assistance can be increased or decreased by reducing or increasing the diameter of passageway 36 and the design parameters of check valve 35.

While I have thus described the preferred embodiments of the present invention, other variations will be suggested to those skilled in the art. For example, the system may be installed on a braking system for trucks or other motor vehicles. It must be understood that the foregoing description is meant to be illustrative only and not limitative of the present invention, and all such variations and modifications as are in accord with the principles described herein, are meant to fall within the scope of the appended claims.

What is claimed is:

1. In combination with a braking system for a vehicle having wheels, said system having fluid actuated brakes and skid control means for detecting skidding of said wheels, a fluid powered motor for applying and releasing said fluid applied brakes, said motor having a dump chamber selectively connectable to said motor to control skidding of said wheels during brake application in response to said control means, said motor comprising:

fluid pressure responsive motor means, said motor means comprising a housing which defines a working chamber having at least one movable wall, said motor being responsive to the admission of pressurized fluid to drive said movable wall to expand said working chamber and apply said brakes with a force proportional to the pressure in said working chamber;

conduit means adapted for connection to a source of pressurized fluid;

dump chamber means located adjacent said working chamber, said dump chamber means being open to atmosphere through an exhaust orifice, said dump chamber means and said orifice being sized for permitting rapid depressurization of said working chamber from a first pressure level at which skidding of said wheels occurs to a second pressure level at which said wheels are released from skidding; but for minimizing further depressurization of said working chamber following release of said wheels, whereby repressurization of said working chamber may be rapidly accomplished to a pressure level below that where skidding occurs to reapply said brakes; and selectively operable valve means responsive to said control means located adjacent said working chamber, said valve means interconnecting said working chamber, said conduit means and said dump chamber means, said valve means serving in one position thereof to admit pressurized fluid from said conduit means to said working chamber while closing communication between said working chamber and said dump chamber means; and in another position thereof to admit pressurized fluid from said working chamber to said dump chamber means while simultaneously maintaining pressurized fluid in said conduit means.

2. A motor as claimed in claim 1 wherein said housing defines a common wall which forms a portion of said working chamber and said dump chamber.

3. A motor as claimed in claim 1 wherein said movable wall comprises a flexible and movable diaphragm, said diaphragm being urged to a first position by a spring biased reciprocating member, and urged to a second position by the admission of said pressurized fluid, said reciprocating member being fixably connected to a hydraulic master cylinder and piston means to provide delivery of hydraulic fluid when said flexible wall is urged to its second position.

4. A motor as claimed in claim 1, wherein said housing comprises a first passageway formed therewith, said first passageway having said conduit means connected thereto and having said valve removably installed therein; a second, high flow capacity passageway formed therewith operatively connecting said working chamber with said valve; and a third, high flow capacity passageway formed therewith operatively connecting said dump chamber means with said valve.

5. A motor as claimed in claim 4 wherein said housing defines a common wall which forms a portion of said working chamber and said dump chamber.

6. A motor as claimed in claim 4 wherein said movable wall comprises a flexible and movable diaphragm, said diaphragm being urged to a first position by a spring biased reciprocating member and urged to a second position by the admission of said pressurized fluid, said reciprocating member being fixably connected to a hydraulic master cylinder and piston means to provide delivery of hydraulic fluid when said flexible wall is urged to its second position.

7. A motor as claimed in claim 4 wherein said dump chamber comprises an exhaust orifice for discharging said portion of said pressurized fluid to atmosphere at a predetermined rate.

* * * * *